United States Patent [19]

Zato

[11] Patent Number: 5,301,023
[45] Date of Patent: Apr. 5, 1994

[54] DATA SLICING SYSTEM

[75] Inventor: Thomas J. Zato, Palatine, Ill.

[73] Assignee: Zenith Electronics Corp., Glenview, Ill.

[21] Appl. No.: 45,275

[22] Filed: Apr. 7, 1993

Related U.S. Application Data

[63] Continuation of Ser. No. 780,698, Oct. 18, 1991.

[51] Int. Cl.$^5$ .................. H04N 7/087; H04N 7/08
[52] U.S. Cl. ...................... 348/476; 348/473
[58] Field of Search ............ 358/147, 146, 142, 13; 375/76, 22; H04N 7/087, 7/08, 7/04

[56] References Cited

U.S. PATENT DOCUMENTS

| | | | |
|---|---|---|---|
| 4,561,100 | 12/1985 | Asao et al. | 375/99 |
| 4,602,374 | 7/1986 | Nakamura et al. | 375/17 |
| 4,620,227 | 10/1986 | Levin et al. | 358/147 |
| 4,667,235 | 5/1987 | Nozoe et al. | 358/147 |
| 4,873,702 | 10/1989 | Chiu | 375/76 |
| 5,136,382 | 8/1992 | Meyer | 358/147 |
| 5,223,930 | 6/1993 | Zato | 358/147 |

FOREIGN PATENT DOCUMENTS

| | | | |
|---|---|---|---|
| 62-084687 | 4/1982 | Japan | H04N 7/082 |
| 62-084686 | 4/1987 | Japan | H04N 7/087 |

*Primary Examiner*—James J. Groody
*Assistant Examiner*—Safet Metjahic

[57] ABSTRACT

A slice circuit for a data signal includes a clamp for clamping the data signal and a comparator having a first input coupled to the clamp, a second input coupled to a filter and an output coupled to a D/A converter. The output of the D/A converter is coupled to the filter such that a pulse width modulated signal is developed in the comparator output which is converted to a DC voltage by the D/A converter and filter for controlling the data slice level. The pulse width modulated signal is the sliced data.

4 Claims, 3 Drawing Sheets

DATA SLICING SYSTEM

This application is a continuation of application Ser. No. 780,698 filed Oct. 18, 1991.

CROSS REFERENCE TO RELATED APPLICATIONS

This invention is related to the inventions described and claimed in application Ser. No. 07/781,059, entitled DATA SAMPLING SYSTEM and application Ser. No. 07/779,442, entitled CLOSED CAPTIONED DATA LINE DETECTION SYSTEM, both in the name of T. Zato and both assigned to Zenith Electronics Corporation.

BACKGROUND OF THE INVENTION AND PRIOR ART

This invention relates generally to on screen display systems for television receivers and specifically to on screen display systems for developing subtitles on the television receiver viewing screen for the benefit of the hearing impaired. More particularly, this invention is concerned with a method of slicing data prior to sampling thereof.

Modern television receivers often incorporate on screen displays, usually for displaying the time, date and channel number. Such displays are also used for controlling various functions such as volume, color, tint, etc. and for so-called picture-in-picture displays. The size and location of the displayed information is often viewer-controllable by means of a remote control device and the microprocessor in the television receiver. Many television receivers also include "teletext" through which a wide range of print and graphics information may be presented to a viewer. Teletext information is received from coded data that is transmitted in the vertical blanking interval (VBI) of the television signal, specifically on one or more designated horizontal lines in the VBI.

Recently, in an effort to better serve viewers who are hearing impaired, the FCC has mandated that certain classes of television receivers must be capable of displaying explanatory subtitles with the video picture. The subtitles will enable a hearing impaired viewer to follow the sense of the dialogue accompanying the televised program and will be available when the receiver is placed in a caption mode by operation of a caption display control. In the normal television viewing mode, the caption feature will not be activated and subtitles will not appear on the television screen.

The captioned data will be encoded on line 21 of the odd field of the television signal and must have specific characteristics. The information on line 21 will consist of a run-in signal, comprising seven cycles of a 0.503 megahertz clock signal immediately following the end of the horizontal sync signal blanking level. The run-in signal is followed by a start sequence consisting of two 0 bits and a 1 bit, which is referred to as the start bit. The start bit is in turn followed by two bytes of either control information or data. The run-in signal commences at 10.074 microseconds from the leading edge of the line 21 horizontal sync pulse, the start bit commences at 27.452 microseconds from the start of horizontal sync and the following two bytes of data (or control information) occupy another 33.764 microseconds. The captioned data only appears on line 21 and is not present in the corresponding line in the even field. Consequently, the system for recovering the captioned data must be able to find line 21 to recover that data.

Conventional line detection circuits are well known in the art for detecting data on selected lines in the television signal VBI. The format of NTSC television signals is such that the line numbers commence after the vertical sync pulse. In a receiver where the horizontal and vertical synchronizing signals are developed by countdown circuits, any particular line number may be readily found. In analog receivers and in VCRs, the nature of vertical sync recovery circuits precludes the use of a simple horizontal pulse counting arrangement to locate a given horizontal line. With such analog recovery circuits, it is not uncommon to reach line 21 by counting 16 or 17 horizontal pulses after the recovered vertical sync pulse. Further, in VCRs, artificial vertical blanking intervals are generated during special effects such as pause and slow motion and one cannot simply count horizontal sync pulses (after recovery of the vertical sync pulse) to determine a particular line in the VBI.

As mentioned, where the horizontal and vertical timing signals are derived by countdown circuits from a common clock, the problem of identifying horizontal line 21 is relatively simple. However, clock countdown circuits are not used in the majority of analog television receivers and the need to quickly and economically bring closed captioning to the marketplace has presented television manufacturers with a major obstacle. Thus there is a need in the art for a low cost closed caption detection system that 1) can reliably find the VBI line that carries the closed captioned data, 2) adjusts the "slice" level of the data for reliable detection, and 3) samples the data reliably without elaborate synchronizing systems.

OBJECTS OF THE INVENTION

A principal object of the invention is to provide a novel closed caption detection system.

Another object of the invention is to provide a closed caption detection system that may be used in a wide range of television receivers.

A further object of the invention is to provide a closed caption detection system for television receivers that is economical, simple and reliable.

A feature of this invention is a method of slicing data prior to sampling thereof.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
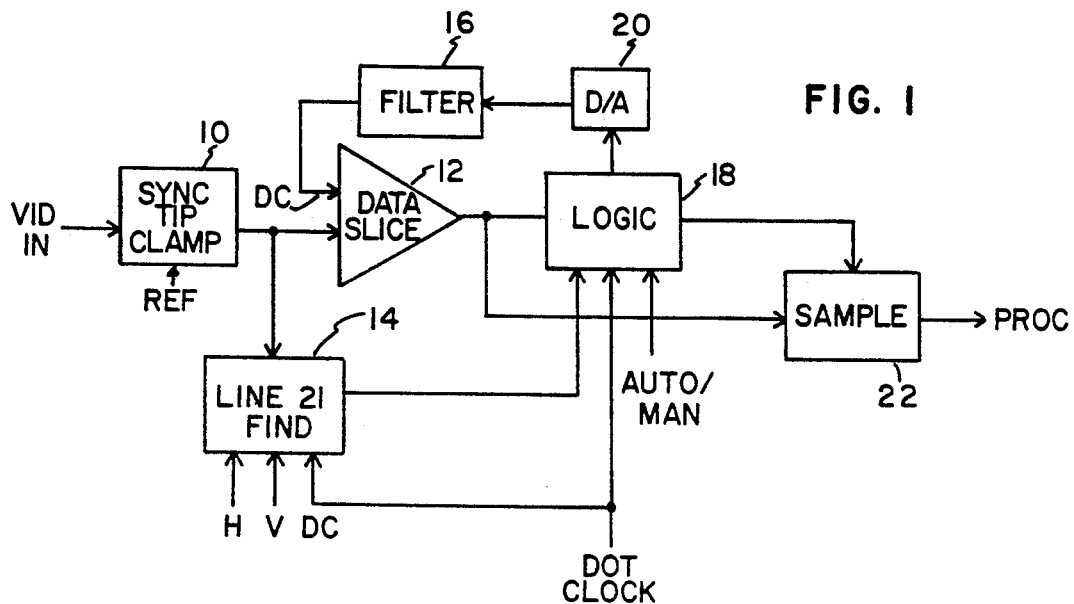
FIG. 1 is a simplified block diagram of a closed caption detection system constructed in accordance with the invention.

Referring to FIG. 1, a source of video input signal (not shown) is applied to a synchronizing signal clamp 10 where the video signal is clamped at the level of the horizontal sync pulse. The output of clamp 10 is supplied to one input of a data slicer 12 and to a line 21 find circuit 14. Data slicer 12 comprises a comparator, the other input of which is a DC potential supplied by a filter 16, which may be a simple resistance-capacitance network. Slicer 12 in turn supplies a logic circuit 18 which operates a digital to analog (D/A) converter 20, the output of which is applied to the input of filter 16. Slicer 12 also supplies sliced data to a sample circuit 22 which is controlled by logic circuit 18. Sources (not illustrated) of horizontal (H) and vertical (V) sync apply suitable signals to the line 21 find circuit 14 which supplies an enable signal for logic circuit 18. A relatively high frequency dot clock signal (approximately 8 MHz) is coupled to line 21 find circuit 14 and to logic circuit 18 for sampling purposes. An auto/manual control signal to logic circuit 18 overrides the automatic slicing circuit and enables direct software control of the slicing level. This will be described below.

Operation of the system is under general software control using the core microprocessor in the television receiver (neither of which is shown). The received television signal is processed in accordance with standard techniques and the video signal is applied to sync tip clamp 10 where the signal is clamped or referenced to horizontal sync tip level. A software routine is run to find line 21 based upon the nature of the captioned data, as will be described below, and in accordance with the invention claimed in copending application Ser. No. 07/779,442, above. In accordance with the present invention, the data is sliced to produce logic level voltage pulses and the slicing level is automatically adjusted to produce a 50% pulse duty cycle, subject to a manual override in the event a different duty cycle is desired. The logic circuit, again under software control, determines the appropriate sampling rate for recovering the encoded data, and the recovered data is supplied to the system for further processing. The latter invention is claimed in copending application Ser. No. 07/781,059, above. While not shown, it is assumed that the receiver includes an alpha-numeric character generator and suitable control circuitry for developing appropriate subtitle displays in response to the encoded data input.

Figure 2:
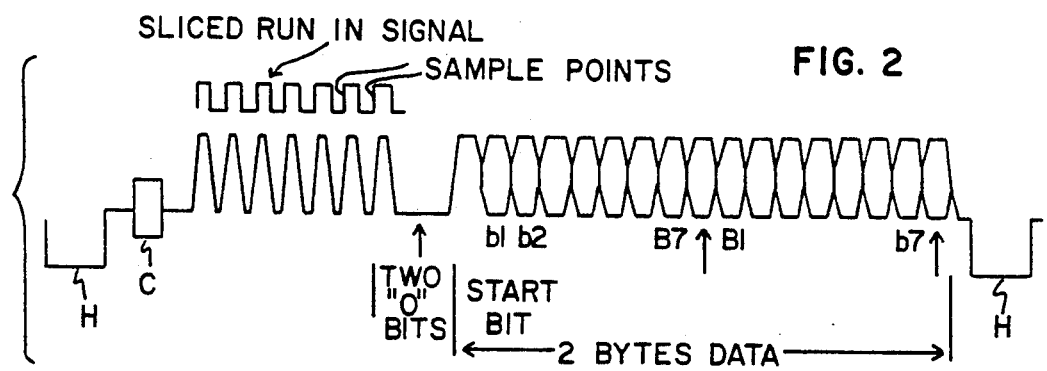
FIG. 2 is a representation of line 21 showing the closed caption run-in signal and information.

In FIG. 2, the format of line 21 is shown to include a standard horizontal sync pulse H and color burst C that occurs during the blanking level of the horizontal sync, followed by the closed caption signal. The closed caption signal consists of seven cycles of the 0.503 MHz frequency, followed by three logic bits—two 0's and 1 start bit. The start bit is followed by two bytes of data which can be either control information or encoded characters.

The invention includes a search routine for finding line 21. This is accomplished by counting 17 horizontal pulses after the vertical sync pulse and opening a window to determine whether the run-in signal is present. In different environments, the initial count or line number may be other than 17. The window is opened approximately 8 microseconds after the commencement of the horizontal sync pulse and remains open for approximately 12 microseconds. The open period of the window corresponds to the occurrence of the seven cycle run-in signal. If the run-in signal is present during this period, the slice level of the run-in signal is optimized, i.e. set to produce a 50% duty cycle. The run-in signal and the subsequent data or control information have the same DC level and format, and therefore it is advantageous to use the run-in signal to adjust the slice level to produce the proper slice level for the subsequent data.

Figure 3A:
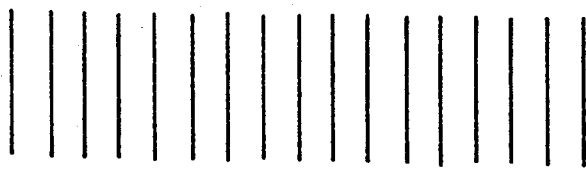
FIGS. 3A-3E are graphical illustrations of optimized data slicing in accordance with one aspect of the invention.
Figure 3B:
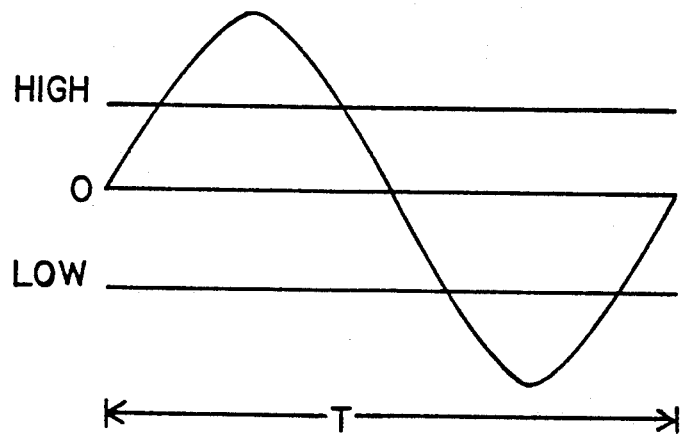
Figure 3C:
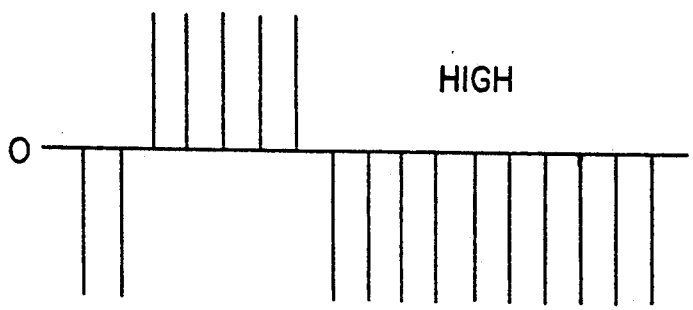
Figure 3D:
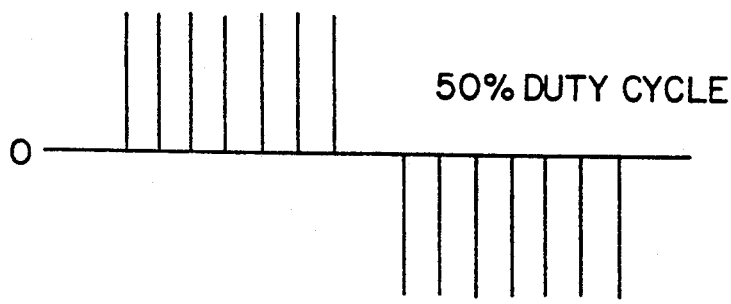
Figure 3E:
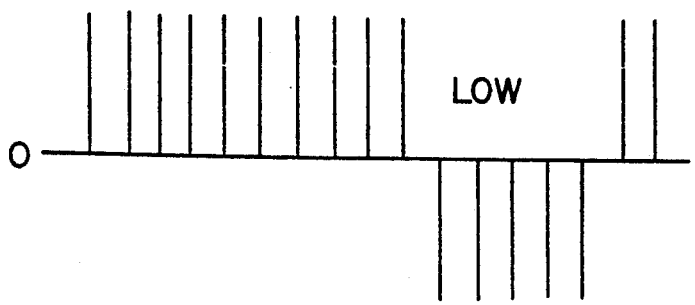

With reference to FIGS. 3A-3E, the operation of the automatic slice level adjustment circuit will be described. It should be noted initially that the prescribed frequency of the run-in signal is known as well as the frequency of the dot clock that is used in the receiver, which in the preferred embodiment, is approximately 8 MHz. Accordingly, the number of "dot clocks" that should occur during one period of the run-in signal is known, and a simple counter and comparator may be used to verify the frequency and the number of cycles of the run-in signal. The dot clock sampling signal is schematically illustrated in FIG. 3A and one cycle of the run-in signal is illustrated in FIG. 3B, with the period T illustrated as one cycle of the run-in signal. In the depiction, there are 16 dot clocks per period T. Thus it is a relatively simple routine to calculate the number of dot clocks that should appear during a cycle of the run-in signal. This figure is programmed into a register and compared with the number of samples detected (by the clock) between subsequent zero crossings of the run-in signal to determine whether the detected signal is of proper frequency. If it is, it is assumed to be the run-in signal and the dot clock is synchronized thereto. Assuming that the run-in signal is present, the ratio of positive samples to negative samples detected may be readily determined to adjust the slice level to produce a pulse width modulated signal with a 50% duty cycle. In FIG. 3B, there is a high level and a low level shown on the run-in signal, with high indicating a high slice level and low indicating a low slice level. FIG. 3C illustrates this graphically and shows the samples detected when the slice level is too high. Clearly, more negative-going samples are produced than positive-going samples. The D/A converter 20 produces voltages corresponding to the samples, which voltages, when filtered, produce a DC potential that reflects the ratio of positive and negative samples over the period T for the input of data slicer 12. In FIG. 3D, the number of positive samples is equal to the number of negative samples during the period T of the run-in signal, which is the desirable 50% duty cycle condition. In FIG. 3E, the results of slicing at too low a level are illustrated and the number of positive samples, produced during the period T, is greater than the number of negative samples, resulting in a potential that is above the desired DC potential for a 50% duty cycle. Thus the D/A converter 20, in conjunction with filter 16, functions as a pulse width modulator that produces a direct current voltage for the input of data slicer 12 that reflects the duty cycle of the sliced run-in signal. As mentioned, the slice level of the run-in signal is used to correctly set the slice level of the following data. In the automatic mode, the duty cycle is automatically adjusted to be 50%. In the manual or override mode, an arbitrary number is applied to the D/A converter 20, which when filtered, produces a DC level at the input of slicer 12 that develops a corresponding slice level. The arbitrary number is determined as desired by the viewer or by the software. This override arrangement permits manual software control of the data slice level should that be necessary or desirable.

Reverting to FIG. 2, a series of three bits, consisting of two 0 bits and a 1 bit (start bit), follow the run-in signal. The start bit identifies the time at which the sampling counter clock is initiated for sampling the subsequent bytes of data. The system is adaptable and the sampling rate determined for the sampling counter is determined by the run-in signal. To illustrate, should the system determine that 8 dot clocks occur between zero crossings of the run-in signal, that number will be used to develop the sampling points for the subsequent two bytes of data. Thus the data will be sampled every 8 dot clocks. It will be appreciated that should greater accuracy be desired, the pattern of dot clocks developed during the seven cycles of run-in signal may be "remembered" and repeated to sample the subsequent data. If the number of dot clocks occurring between successive zero crossings of the run-in signal is 8-8-9-8, for example, that 8-8-9-8 pattern can be repeated to sample the subsequent two bytes of data. Such patterns will occur because the dot clock frequency and the run-in signal frequency are not synchronized and develop a beat frequency. Using the same pattern found in the run-in signal improves sampling accuracy. In the preferred embodiment, only one cycle of run-in signal is used to determine the subsequent sampling pattern for the line. The data sampling method is claimed in copending application Ser. No. 07/781,059, above.

Figure 2A:
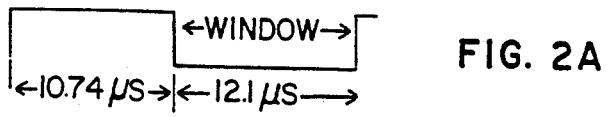
FIG. 2A denotes the window for the run-in signal in alignment with the first portion of line 21 of FIG. 2.

As discussed above, with most television receivers, simply counting horizontal sync pulses after the vertical sync pulse will not reliably find line 21 (or any particular line in the VBI). The disclosed search system will automatically find line 21. The particular algorithm used, however, is representative and should not be considered limiting. After the vertical blanking interval, an arbitrary count of 17 horizontal sync pulses is used to trigger the development of the window illustrated in FIG. 2A. After the 17th horizontal pulse, a 10.74 microsecond delay is incorporated, followed by a dot clock controlled counter that begins sampling the video input. If line 21 (in the first field) is present and includes captioned data, the run-in signal will appear. The dot clock controlled sampling will develop a series of positive and negative samples corresponding to the positive and negative portions of the sinewave run-in signal. The number of samples (or dot clocks) occurring between zero crossings of the signal is determined for assuring that the frequency of the signal is correct, as mentioned above, and the number of positive and negative samples during a period T is used to determine the duty cycle. Should no clock run-in signal be detected, the algorithm changes the initial horizontal pulse count number, which cause the window to be opened at a different horizontal line in the VBI. In the algorithm of the preferred embodiment, the count is changed from 17 to 18 and another search is conducted with a window again being opened to check for the run-in signal. If no run-in signal is found, the counter is incremented by one and a search conducted until 20 horizontal pulses are counted before the window is opened. If the run-in signal is still not found, it is assumed that the field is wrong and a change is made to search similar lines in the opposite field, beginning with line 15 and counting through line 20. This is accomplished with a first counter that introduces a 20 microsecond delay after the vertical sync and a second counter that opens a 16 microsecond wide window to determine whether a horizontal pulse is present in the video signal. The different fields are determined as follows. If a low is found during the 16 microsecond window, it is assumed that the field is odd. If no low is found and a horizontal pulse is found, it is the even field. A flag is set in a register to indicate the odd field and this flag is periodically checked by the software to verify that the correct field is being accessed. Once the line with captioned data is found, the software remembers the initial horizontal pulse count number and the correct field and immediately counts to the proper line after the vertical sync. Should the run-in signal be missing due to a drop out, a change in channel, or the like, the search algorithm is reinitiated to find line 21 with the captioned data. It may be seen that with the system, the captioned data may be placed on other than line 21 of the odd field and still be automatically and reliably found, although the standards dictate line 21, which simplifies things.

Figure 4:
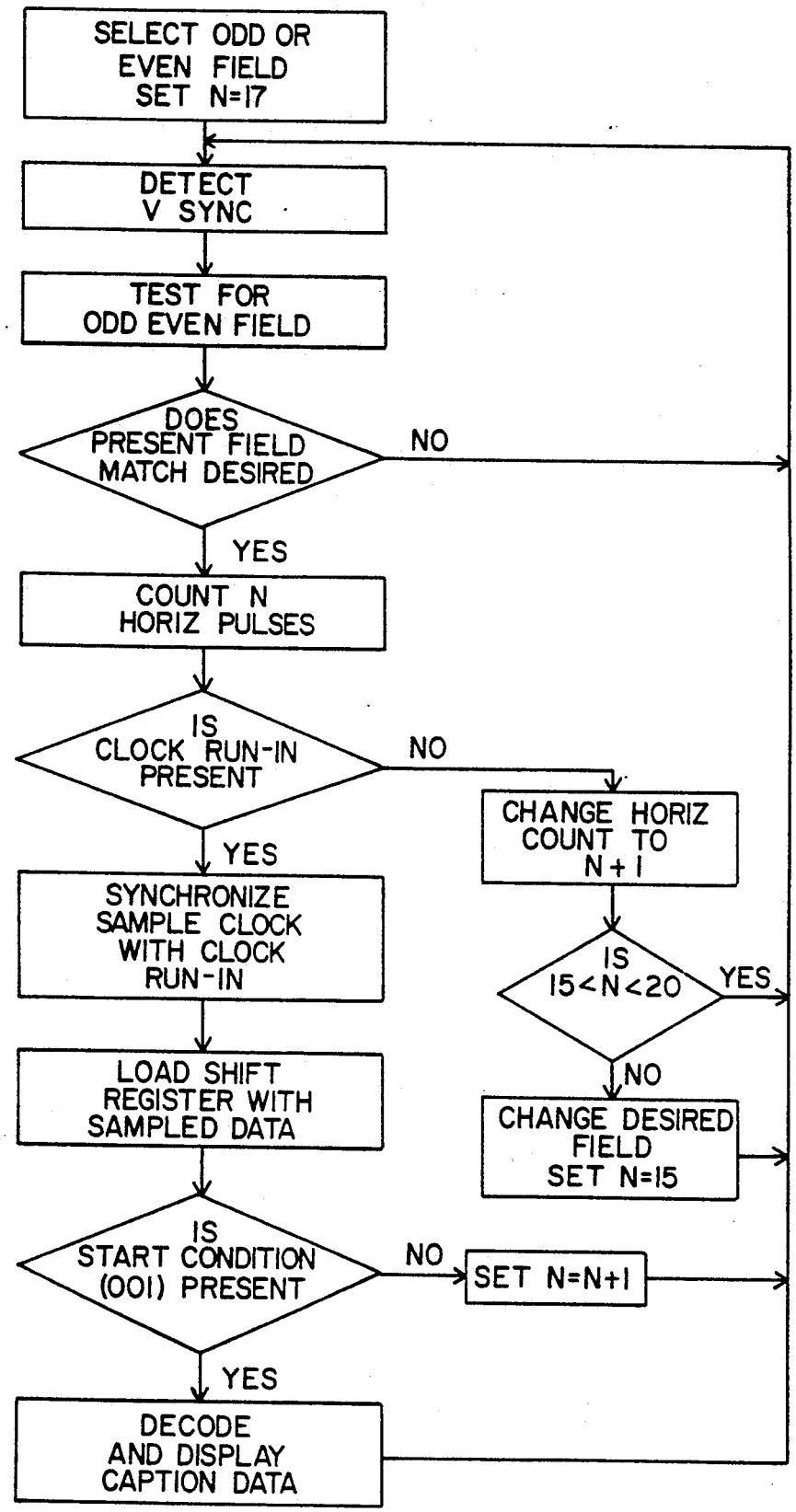
FIG. 4 is a simplified flow chart of portions of the operation of the closed captioned data system of the invention.

FIG. 4 is a flow chart indicating the operation of the system of the invention beginning with the selection of a field (odd or even) setting of N and detection of the vertical sync. Counting of the initial number N of horizontal pulses after the vertical sync to reach a "target" line (hopefully line 21) is carried out. Thereafter the number of dot clock samples detected over the period of the sampled signal determines whether the sampled signal is the run-in signal, i.e. whether the sampled signal has the correct frequency. If the run-in signal is not found, a search routine is commenced during which different lines in the vertical blanking interval are addressed and tested for the presence of the run-in signal. If none of the searched lines yield the run-in signal, a shift is made to the opposite field and the routine is run again. This routine is continually run as long as the captioned data decode mode is selected by the user. When the line with the run-in signal is found, and the system is operating in an automatic mode, the duty cycle of the sliced run-in signal is automatically established at 50%. Should the manual mode be selected, an override of the automatic mode is in effect and the duty cycle is determined by the particular number that is loaded into the D/A converter by the software. Finally, when the appropriate duty cycle of the sampled run-in signal is produced, the start bit is found, and in conjunction with the sample rate established by the number of dot clocks that occurred between successive zero crossings of the run-in signal, coordinates the sampling of the subsequent data in the line.

Thus the system of this invention enables the slice level of the data to be automatically adjusted to the optimum 50% duty cycle level. Also, the captioned data may be reliably found without relying upon a precise indication of the initiation of the vertical blanking interval in the television receiver and the sampling pattern for the data to be accurately determined based upon the run-in signal frequency. This is all accomplished through simple logic and software and simple hardware such as counters and comparators. It is recognized that numerous changes and modifications in the described embodiments of the invention will be apparent to those skilled in the art without departing from its true spirit and scope. The invention is to be limited only as defined in the claims.

What is claimed is:

1. A method of slicing a data signal comprising:
   clamping the data signal to a reference level;
   applying the clamped data signal to one input of a comparator to produce a sliced output;

sampling the sliced output of the comparator with a high frequency dot clock to produce a series of positive and negative logic levels;

applying the series of positive and negative logic levels to a D/A converter;

filtering the output of the D/A converter to develop a DC voltage; and applying the DC voltage to the other input of said comparator to adjust the slice level of the comparator.

2. The method of claim 1 wherein said data signal is included in a television signal line and is preceded by a horizontal sync pulse, the tip of said horizontal sync pulse establishing said reference level.

3. A data slice circuit comprising:

clamp means for clamping a received data signal to a reference level;

a comparator having a first input coupled to said clamp means, a second input and an output;

means for sampling the output of said comparator with a high frequency dot clock to develop a series of positive and negative logic levels for a period of said data signal;

a D/A converter coupled to said comparator output and receiving said series of positive and negative logic levels; and filter means coupled between the output of said D/A converter and said second input of said comparator for developing a DC voltage representative of said series of positive and negative logic levels and for applying said DC voltage to said second comparator input for adjusting the slice level of said comparator.

4. A method of optimizing the slice level of a digital data signal comprising a run-in portion and a data portion of the same data rate comprising:

clamping the digital data signal to a reference level;

applying the clamped data signal to one input of a comparator for slicing the clamped data signal at a first level;

sampling the sliced data signal with a high frequency dot clock to generate a series of positive and negative logic levels for a period of the sliced data signal;

applying said series of positive and negative logic levels to a D/A converter;

filtering the output of said D/A converter to develop a DC voltage based upon said series of positive and negative logic levels; and applying the DC voltage to another input of said comparator to adjust said first level.

* * * * *